United States Patent [19]
Selph

[11] 3,868,293
[45] Feb. 25, 1975

[54] REUSABLE GLARE ELIMINATOR PATCH

[76] Inventor: Kristin Mills Selph, P.O. Box 227, Ranchos De Taos, N. Mex. 87557

[22] Filed: Jan. 22, 1973

[21] Appl. No.: 325,536

Related U.S. Application Data

[63] Continuation-in-part of Ser. No. 236,065, April 27, 1972, abandoned.

[52] U.S. Cl. ............... 161/1, 156/108, 161/6, 161/39, 161/113, 161/145, 161/269, 161/406, 161/408, 296/97 R, 296/97 D, 296/97 F

[51] Int. Cl. ......... B60j 3/06, B32b 3/10, B32b 3/16

[58] Field of Search ............ 161/1, 6, 39, 113, 145, 161/406, 269, 408; 296/97 R, 97 A, 97 H; 156/108

[56] References Cited
UNITED STATES PATENTS

| | | | |
|---|---|---|---|
| 2,249,927 | 7/1941 | Abramson | 161/39 |
| 2,619,168 | 11/1952 | Leverence | 161/406 |
| 2,863,697 | 12/1958 | Watkins | 296/97 |
| 3,363,666 | 1/1968 | Hodgson et al. | 296/97 |
| 3,511,365 | 5/1970 | Dow | 296/97 |
| 3,582,441 | 6/1971 | Guffan | 161/39 |
| 3,737,364 | 6/1973 | Heinol, Jr. | 161/406 |

FOREIGN PATENTS OR APPLICATIONS

| | | | |
|---|---|---|---|
| 198,565 | 6/1923 | Great Britain | 296/97 |

Primary Examiner—George F. Lesmes
Assistant Examiner—Charles E. Lipsey
Attorney, Agent, or Firm—John A. Robertson

[57] ABSTRACT

This specification discloses a reusable glare eliminator patch comprising a panel of thin cast tinted, polarized cellulose acetate, a mounting frame of a thin plastic having one face coated with a pressure-sensitive adhesive and applied about marginal portions of the oanel leaving portions of the frame extending beyond the edges of the panel, and a semi-rigid flexible carrier sheet to which the frame is adhesively secured by the extended portions thereof.

3 Claims, 3 Drawing Figures

3,868,293

REUSABLE GLARE ELIMINATOR PATCH

This application is a continuation-in-part of the copending application of Kristin Mills Selph, Ser. No. 236,065, filed Apr. 27, 1972, now abandoned, and entitled "Reusable Adhesive Glare Eliminator-RAGE."

The present invention relates to glare eliminators and is concerned primarily with a reusable patch including a panel of thin cast, polarized cellulose acetate.

BACKGROUND OF THE INVENTION

The annoyance of glare from the sun or other light sources has long been recognized by those attempting to improve the conditions under which an automobile is driven. This glare is present when sunlight is directed at the windshield or any of the windows of the vehicle. In many instances, it affects the vision afforded by a rear vision mirror. Numerous attempts have been made by developers and research workers in this field to obviate this undesirable condition. It may be stated as a general rule that such attempts follow the pattern of providing a tinted visor or patch which is applied to the particular element from which glare is to be eliminated. It has been found that if such a device is to achieve the desired effect, the tinting must be fairly heavy. In these known devices, the glare may be eliminated but at the same time vision is impaired which is a highly undesirable condition.

It has been found under practical driving conditions that sunlight will strike the windshield or windows from various directions and various angles. Thus, on certain occasions, sun may produce a glare on one side of a vehicle and in other instances on the other side. Thus, the desirability of a glare eliminator patch which may be readily applied to a particular area and removed therefrom for application to another site is indicated.

Any glare eliminator must not be so thin as to wrinkle and thus impair vision. Moreover, if it is thick and rigid, it will not conform to the contour of the particular element to be protected.

At the present time, light polarizers are known. The Marks Polarized Corporation of Whitestone, New York now produces a line of polarized products under the following patents: U.S. Pat. Nos. 3,300,436, 3,205,775, 3,263,272, 3,298,959, 2,897,544 and 3,253,506. One of these is a tape of cellulose acetate to which a chemical composition has been applied and which in its final form has the thickness of from .0003 to .0006 inch. This product is characterized as a foil and is cited as an example of a polarizing element which is too thin for use as a glare eliminator because of the liability of its becoming wrinkled. However, the said Marks Polarized Corporation also produces a product identified as cellulose acetate (cast) at thicknesses of .005, .010 and .015 inch and are which herein identified as polarized thin cast cellulose acetate. While it has the property of flexibility to the degree required for applying it to any glass surface ordinarily found in the conventional automobile or other places, it has a body consistency which might be called semi-rigid which eliminates the possibility of wrinkling.

Pressure-sensitive adhesive tapes are now well known and in extensive use. Such adhesive tapes are ordinarily of cellulose and have one face coated with a pressure-sensitive adhesive. Such pressure-sensitive materials are now manufactured and sold by the Minnesota Mining and Manufacturing Company under the Scotch Brand trademark. The present invention is founded on the concept of providing a panel of thin cast polarized cellulose acetate of desired dimensions and applying a frame of a plastic having one face coated with a pressure-sensitive adhesive about the marginal portions thereof, with the adhesive securing the two together, leaving portions of the frame extending beyond the panel. The assembled panel and frame are then applied to a carrier sheet for convenience in handling. When the use of this glare eliminator patch is required, it is stripped from the carrier sheet and adhesively secured to the particular glass surface from which glare is to be eliminated by the extended portions of the frame. Moreover, it may be stripped from one place on a vehicle and applied to another.

OBJECTS OF THE INVENTION

With the foregoing conditions in mind, the present invention has in view the following objectives:

1. To provide a glare eliminator patch which includes a panel of thin cast polarized cellulose acetate.
2. To provide, in a glare eliminator patch of the type noted, a plastic frame having one face coated with a pressure-sensitive adhesive which is applied to marginal portions of the panel, leaving portions of the frame extending beyond the edges of the panel.
3. To provide, in a glare eliminator patch of the character aforesaid, a carrier sheet for the patch.
4. To provide, in a glare eliminator patch of the kind described, a thin cast polarized panel of cellulose acetate which is tinted.

Various other more detailed objects and advantages of the invention, such as arise in connection with carrying out the above ideas in a practical embodiment, will, in part, become apparent, and, in part, be hereafter stated as the description of the invention proceeds.

SUMMARY OF THE INVENTION

The foregoing objects are achieved by providing a glare eliminator patch consisting essentially of a panel of thin cast, polarized cellulose acetate which may be tinted. This panel may be of any size or shape desired. A frame having substantially the same shape as the panel but of larger dimensions is attached to marginal portions of the panel leaving portions of the frame extending therebeyond. This frame is coated with a pressure-sensitive adhesive on one face, which is the face which engages the panel. For convenience in handling, the frame with the panel attached thereto is secured to a carrier sheet with the extended portions of the frame adhering to the carrier sheet. In use, the frame with the panel is stripped from the carrier sheet and applied to a glass surface from which glare is to be eliminated.

For a full and more complete understanding of the invention, reference may be had to the following description and the accompanying drawing, wherein.

DESCRIPTION OF THE PREFERRED EMBODIMENT

Figure 1:
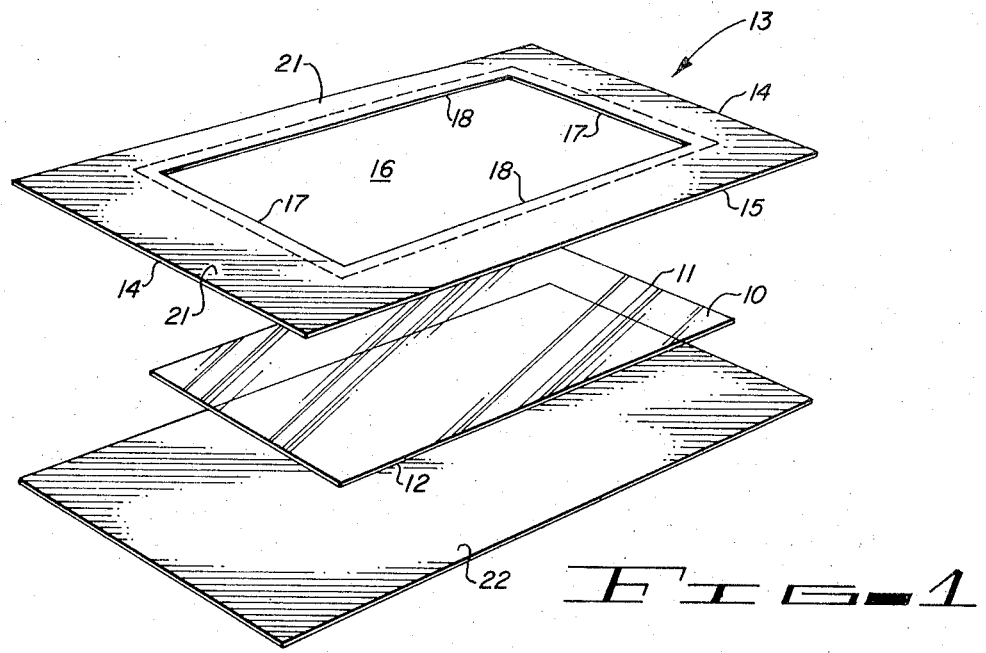
FIG. 1 is a perspective illustrating the elements of a glare eliminator patch embodying the precepts of this invention in exploded relation.

Referring now to the drawings, wherein like reference characters denote corresponding elements throughout the several views, and first to FIG. 1, a polarized thin cast panel of cellulose acetate is shown at 10. As pointed out above, the Marks Polarized Corporation produces this material in thicknesses of .005, .010 and .015 inch. Inasmuch as this panel must have the property of flexibility to a desired degree and at the same time be wrinkle-proof, a thickness of .010 inch is indicated as the preferred embodiment. This material is available in sheets of 18 × 24 inches. It is contemplated that the patch of this invention will not be provided in any such sizes, and such sheets will, therefore, be cut into the required size and shape.

While it is possible for the panel 10 to be of various sizes and shapes, dimensions of 2 × 3 inches are indicated as preferred because it is believed they will find the widest field of utility.

It is also notable that while an untinted panel 10 will achieve the glare eliminating effects to the degree required for most conditions, this panel may be tinted with a desired color. However, it is also notable that such tinting will not even approach known glare eliminators in the intensity of tinting.

Panel 10 presents end edges 11 and side edges 12. A frame is identified in its entirety by the reference character 13. This frame has peripheral end edges 14 of greater extent than end edges 11 of panel 10 and side edges 15 of greater extent than side edges 12 of panel 10. Frame 13 has a central cutout or opening 16 defined by end edges 17 and side edges 18. End edges 17 are of a length shorter than end edges 11 of panel 10 and side edges 18 are of a length less than that of side edges 12. While frame 13 may be of any so-called pressure-sensitive material which is now meeting with widespread use, the product sold by the Minnesota Mining and Manufacturing Company under the trademark Scotch Brand is indicated as being completely acceptable. This product is a cellulose acetate, one face of which is coated with a pressure-sensitive adhesive. The face of panel 13 which confronts panel 10 is coated with the pressure-sensitive adhesive indicated at 19.

Figure 2:
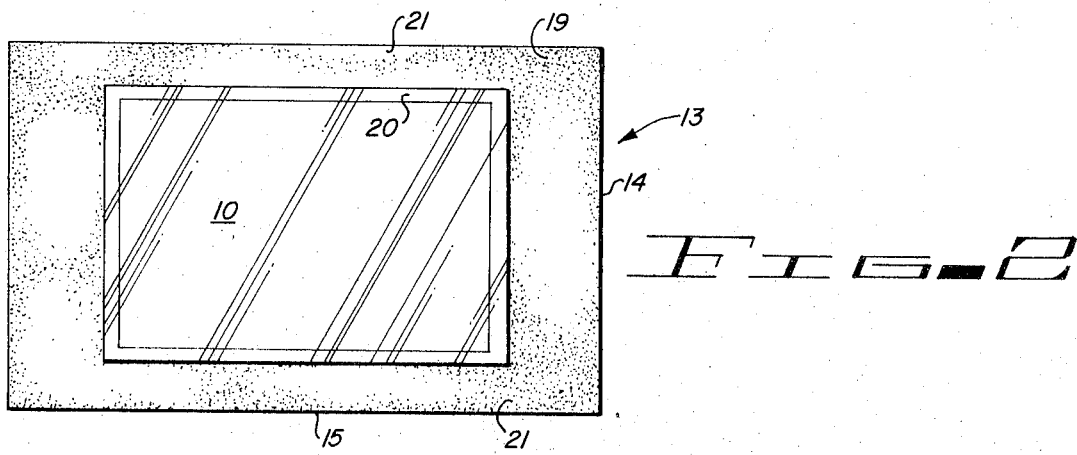
FIG. 2 is a plan view of the panel as assembled on the frame and looking at the face of the frame which is coated with the adhesive.

When frame 13 is applied to panel 10 in the manner depicted in FIG. 2, marginal portions of the panel such as represented at 20 are engaged by the adhesively coated face 19 to secure the panel to the frame and maintain the assembled relation. This leaves so-called extended portions 21 of the frame which project beyond panel 10. A carrier sheet 22 is of the same size and shape as that defined by the periphery of frame 13. While carrier sheet 22 may be of any cellulosic materials which are available to the public, in the preferred embodiment it is the self-adhesive plastic sold under the designation CON-TACT Brand by the Comark Plastics Division of United Merchants and Manufacturers, Inc. of New York, New York. The carrier sheet 13 is also best described as being semi-rigid, having the property of flexibility to a required degree, and yet being sufficiently rigid to prevent wrinkling of panel 10 when the latter is carried thereby through the medium of frame 13.

It is notable that the subject invention is herein illustrated and described in what might be called its simpliest form. Thus, the patch with the carrier sheet is shown as an individual unit which is adapted to be stored either individually or in multiple in an envelope. However, they could well be formed as a continuous tape in which individual patches are separated by tear lines.

MODE OF USAGE

Figure 3:
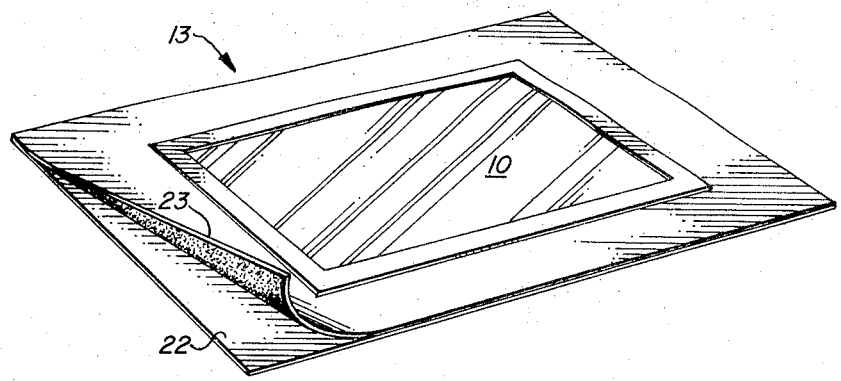
FIG. 3 is a perspective depicting the patch as assembled on a carrier sheet with a corner of the frame peeled back.

While the manner of using the subject glare eliminator patch is believed to be obvious from the drawing and description of parts set forth above, it may be briefly described by noting that when a patch is to be applied to a particular transparent surface, a corner of the frame 13 is peeled back as shown at 23 in FIG. 3 and the frame stripped from the carrier sheet 22. The frame is then applied to the particular transparent surface from which glare is to be eliminated by merely pressing the extended portions 21 of frame 13 against the surface. This secures the panel 10 in effective position and without wrinkling thereof. Should the user desire to place a patch at another site, he simply peels back the frame in the manner above described and applies it to the new location.

While a preferred specific embodiment is herein disclosed, it is to be clearly understood that the invention is not to be limited to the exact construction, materials and designs illustrated and described because various modifications of these details may be provided in putting the invention into practice.

What is claimed is:

1. In a reusable glare eliminator patch,
   a. a thin cast rectangular panel of polarized cellulose acetate of a thickness ranging from .005 inch to .015 inch, and having marginal portions defined by end and side edges;
   b. a rectangular plastic frame of cellulose acetate having one face coated with a pressure-sensitive adhesive material and similar in shape to said panel, said frame being formed with a central rectangular cutout similar in shape to said panel but of a size smaller than that of said panel;
   c. said frame having end and side edges longer than the corresponding edges of said panel, the face of said frame with the pressure-sensitive adhesive material being adhered to said panel such that said panel fully covers said cutout, the end and side portions of said frame extending beyond the corresponding edges of said panel, and
   d. a flexible carrier sheet, having sufficient rigidity to prevent wrinkling of said panel when the latter is carried thereby through the medium of said frame, of the same size and shape as said frame presenting end and side edges and a continuous uninterrupted body between said carrier sheet edges, said carrier sheet being applied to said frame with its edges accurately conforming to the edges of said frame, with the extended portions of said frame adhesively but releasably secured to said carrier sheet.

2. The reusable glare eliminator patch of claim 1 in which the panel has a thickness of .010 inch.

3. The reusable glare eliminator patch of claim 1 in which the panel has a thickness of .015 inch.

* * * * *